United States Patent [19]

Schilling et al.

[11] Patent Number: 4,702,565
[45] Date of Patent: Oct. 27, 1987

[54] CROSS-SLIDE STAGE FOR A MICROSCOPE

[75] Inventors: Albert Schilling; Edwin Schüttler; Karl-Wilhelm Schmekel; Axel Rohde, all of Aalen, Fed. Rep. of Germany

[73] Assignee: Carl-Zeiss-Stiftung, Oberkochen, Fed. Rep. of Germany

[21] Appl. No.: 833,064

[22] Filed: Feb. 26, 1986

[30] Foreign Application Priority Data

Mar. 7, 1985 [DE] Fed. Rep. of Germany ....... 3508094

[51] Int. Cl.$^4$ ...................... G02B 21/26; G02B 21/36; A47B 3/06
[52] U.S. Cl. .................................... 350/531; 108/143; 350/532
[58] Field of Search ............... 350/529, 530, 531, 532; 108/140, 143, 103

[56] References Cited

U.S. PATENT DOCUMENTS

| | | | |
|---|---|---|---|
| 893,957 | 6/1908 | Watkins | 350/532 |
| 4,193,317 | 3/1980 | Oono et al. | 108/140 |
| 4,552,033 | 11/1985 | Märzhäuser | 350/531 |
| 4,589,741 | 5/1986 | Clegg | 108/103 |

FOREIGN PATENT DOCUMENTS

| | | |
|---|---|---|
| 314861 | 4/1974 | Austria . |
| 1311435 | 9/1934 | Fed. Rep. of Germany . |
| 1047473 | 12/1958 | Fed. Rep. of Germany ...... 350/531 |
| 95121 | 12/1971 | Fed. Rep. of Germany . |

Primary Examiner—John K. Corbin
Assistant Examiner—Vincent J. Lemmo
Attorney, Agent, or Firm—Hopgood, Calimafde, Kalil, Blaustein & Judlowe

[57] ABSTRACT

In addition to providing fine adjustment for precise two-coordinate positioning of a specimen, a microscope stage has a handle for rapid displacement of the stage when the fine adjustment is disconnected. This handle is secured to the underside of the cross-slide (6) of the stage, and in a laterally central position of the stage; the handle also extends through a cut-out in the stage carrier, thereby defining the range of movement of the stage. The arrangement of the handle is ergonomically favorable and reduces the danger of contamination of the specimen. In addition, a rotatable sleeve on the handle enables fine and precise adjustment of the angular orientation of a chucked specimen, with respect to the microscope.

8 Claims, 3 Drawing Figures

CROSS-SLIDE STAGE FOR A MICROSCOPE

BACKGROUND OF THE INVENTION

The present invention relates to a mechanical microscope stage having provision for fine adjustment for precise positioning of the stage and having a handle for rapid displacement of the stage when the fine adjustment is disconnected.

Such mechanical stages, having X-Y slides for two-axis displacement of a specimen, are needed in optical inspection of so-called wafers, i.e., semiconductor substrates, where rapid scanning of the specimen and precise adjustment of individual partial regions are both required.

The mechanical stages which have thus far been used for this purpose have, in addition to providing fine-adjustment for the precise displacement of the stage (wherein the fine-adjustment means is at one lateral side of the stage and employs coaxial elements with a strong step-down ratio), also provides a handle for rapid displacement of the stage, the handle being arranged directly on the movable stage plate, and also on one lateral side thereof. In such a stage, as for example the stage described in GB-A-2,079,969, the handle is approximately at the same height as the surface of the stage. However, this arrangement results in increased danger of contaminating the specimen, which must be examined under clean-room conditions. It is therefore customary to form the rapid-displacement handle as a downwardly bent yoke which is arranged at one side of the stage and can be gripped below the plane of the stage. This solution, however, is also unsatisfactory since with such a laterally disposed yoke, the point of actuating-force application is at some distance from the stage guides, and a long yoke is unstable.

Furthermore, a lateral positioning of the handle is ergonomically unfavorable since it must necessarily favor a given hand of the operator and does not permit optional gripping by the other hand, which may happen to be free at the time; such handle positioning thus requires frequent groping for the handle.

Austrian Patent No. 314,861 discloses a mechanical stage suitable for examining semiconductor substrates wherein a common handle serves for fine positioning and rapid displacement. The handle is in the form of a lever which is mounted in a ball socket. The lever can be guided along a template which is secured alongside the stage. But this lever is also disposed on one side of the stage, far from its guides, so that the stage is thereby given a projecting and not very compact shape which interferes with attachment of such additional instrumentalities as an automatic conveyor unit for feeding or removal of the specimens.

Federal Republic of Germany Utility Model No. 1,311,435 and German Democratic Republic Pat. No. 95,121 also disclose mechanical stages in which the fine adjustment is located centrally below the stage. These mechanical stages, however, do not have a handle for rapid displacement when the fine adjustment is disconnected.

BRIEF STATEMENT OF THE INVENTION

The object of the present invention is to provide a mechanical stage of the aforementioned type which is of compact construction and which, for rapid displacement of a specimen, can be easily operated without danger of contaminating the specimen.

This object is achieved by providing a stage-displacing handle secured to the underside of the movable specimen-supporting part of the stage and by providing a cut-out in the stationary stage component, with the handle extending through the cut-out and having such freedom to move within the cut-out as to enable inspection under the microscope, of all regions of the specimen.

In this arrangement, the rapid-displacement handle is disposed in the immediate vicinity of the guided parts of the stage; the handle can be made short and thus stable, and it can be laterally central, for convenient optional gripping access either by the left hand or by the right hand of the user, without any danger of specimen contamination.

The stage-carrier cut-out through which the handle extends is advisedly shaped to correspond essentially to the outside dimensions of specimens to be examined on the stage, and it has a local outward recess into which the shank of the handle can locate to define a specific stage position which can be rapidly and easily accessed, as for example to position a stage-mounted receiver for specimen-transfer with respect to an automatic specimen transfer unit.

It is particularly advantageous to so associate an electric switch probe with this local recess as to be actuated by the shank of the handle when in the recess-located position. Such a switch may serve, (1) to report to the above-mentioned transport device that the stage is in the transfer position, and (2) to commence the automated process of removing an inspected specimen and introducing a next specimen to be inspected.

Cross-slide stages which are used for inspection of semiconductor substrates are usually equipped with a specimen-mounting chuck which can be rotated through at least a small angle to permit angular adjustment of the specimen relative to the guides of the stage. In known devices for this purpose, the displacement lever or wheel for effecting the angular adjustment is located above the stage plate.

In one advantageous further development of the invention, the drive for angular adjustment of the specimen chuck is integrated into the handle for rapid displacement of the cross-slide stage; the angular-adjustment provision is thus placed below the table, thereby presenting a better solution from the standpoint of avoiding contamination of the specimen.

DETAILED DESCRIPTION

The invention will be illustratively described in detail, in conjunction with the accompanying drawings, in which:

FIG. 3 is a view in section, taken through the handle 11 of FIG. 1, along the line III—III of FIG. 1.

Figure 1:
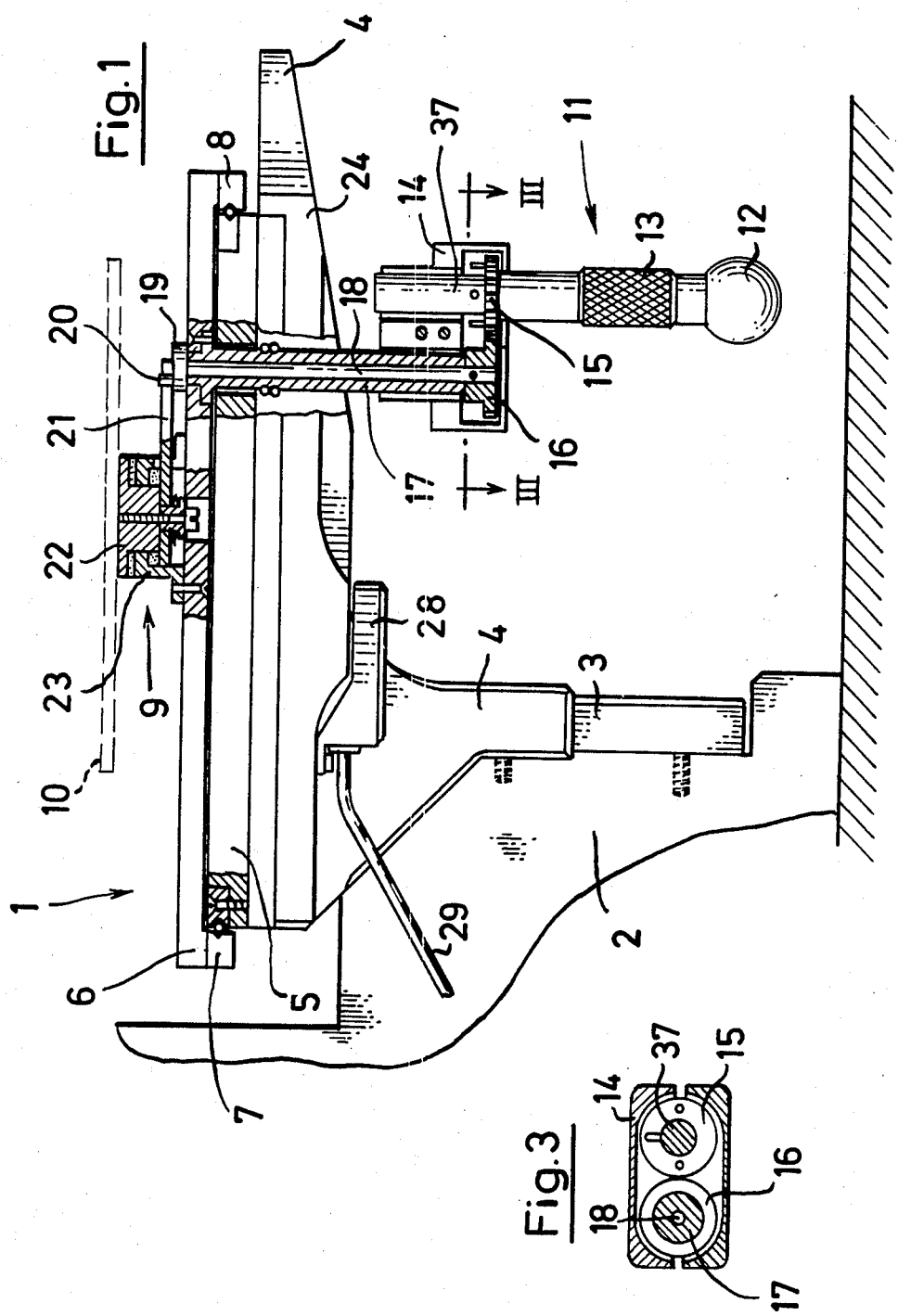
FIG. 1 is a side view, partially in section, of a cross-slide stage of the invention.
Figure 2:
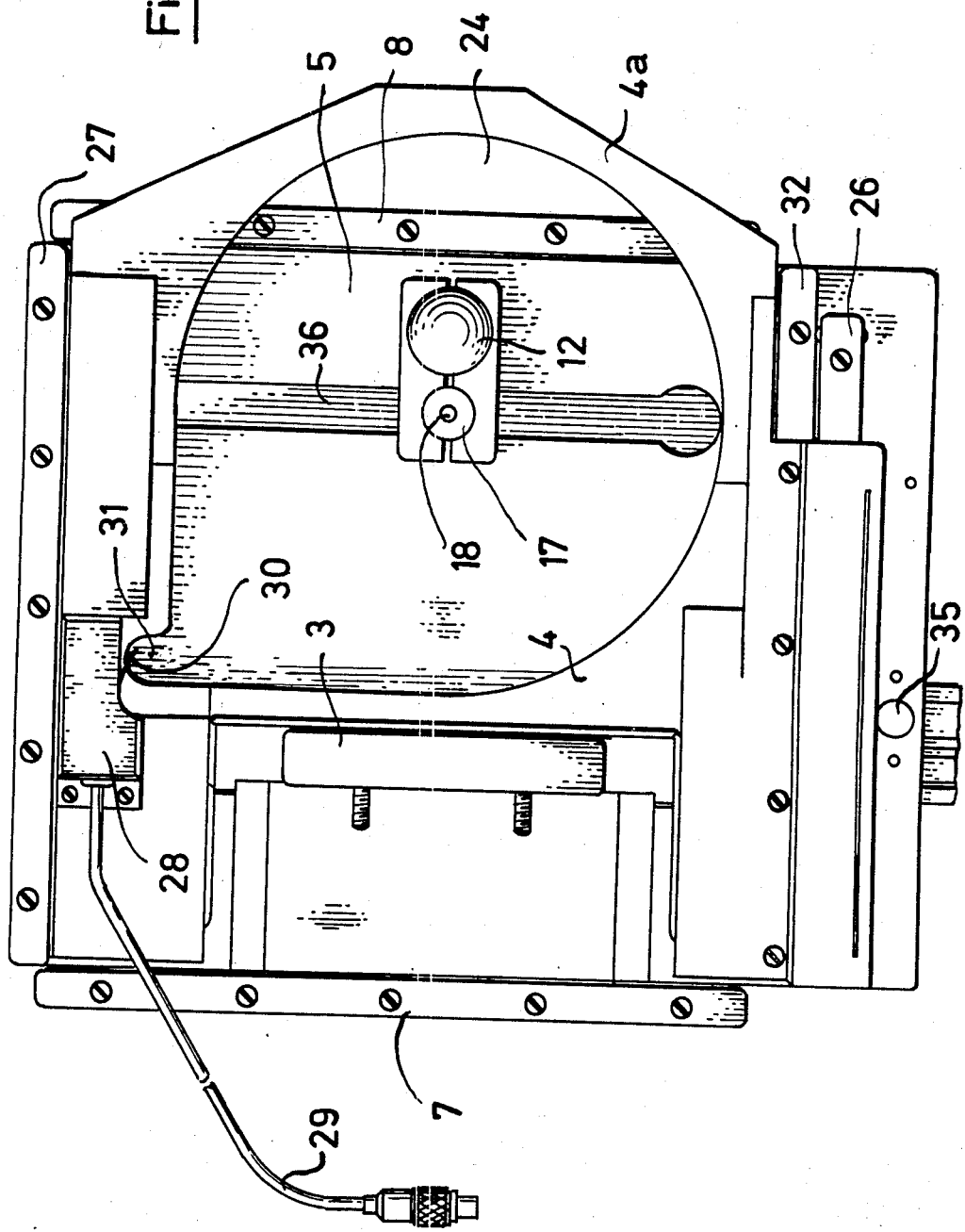
FIG. 2 is a view of the stage of FIG. 1, seen from below.

The stage 1 of FIGS. 1 to 3 includes a mount 3 by which it can be secured to the limb 2 of a reflected-light microscope, not shown in detail. The mount 3 and a stage carrier 4, which carries the movable parts of the stage, are of one-piece construction, for reasons of stability. The stage carrier 4 extends continuously upward and transversely of the mount 3, to provide a horizontal platform having spaced guide members 32 for a main slide which will be referred to as the X-slide 5, and the mating guide members 26 and 27 of said slide are recessed between and guided by the guide members 32 of the stage carrier. In turn, the X-slide 5 carries the Y or cross-slide 6 which is movably guided by rails 7 and 8 which coact with edge guides recessed in the X-slide 5.

The cross-slide 6 forms the actual stage plate and will sometimes be referred to as such. It is shown mounting a receiver or chuck 9 for a specimen 10 which is to be observed under the microscope and which may illustratively be a semiconductor substrate (wafer); detail is not shown for specimen-10 retention by chuck 9, but this may typically include a suction nozzle for vacuum retention of the specimen.

A handle 11 mounted to the bottom of the stage plate provides means by which the stage plate 6 can be directly and rapidly displaced upon disconnection of separate means for fine-adjustment of the stage plate; the fine-adjustment means is not shown in detail, but it will be understood to be selectively operative at point 35 (FIG. 2) on the respective guides of the X-slide 5 and the Y-slide 6.

The handle 11 comprises a ball head 12 at the bottom of a non-rotatable rod 37 which is connected via a gear housing 14, to a tubular shaft 17 which, in turn, is securely attached to the stage plate 6. Shaft 17 is thus effectively the shank of handle 11; it extends through a slot 36 in the X-slide 5 and through a substantially circular cut-out 24 in the stationary stage carrier 4. A sleeve 13 has a knurl and is rotatable on rod 27; the upper end of sleeve 13 extends into gear housing 14 and carries a first or drive pinion 15, and pinion 15 meshes with a second pinion 16 at the lower end of a driven shaft 18 which is rotatable within the tubular shank 17, as also appears in the sectional view of FIG. 3. The upper end of shaft 18 extends above the stage plate 6 and drives a disk 19 having an eccentric crank pin 20.

The receiver or chuck 9 comprises a flanged bearing member 22 that is journaled for rotation about a vertical axis in a housing 23, and the latter has a side port whereby a crank arm 21 keyed to bearing member 22 extends outside the housing and has limited freedom for fine angular adjustment of a specimen 10 carried by the flange of bearing member 22. The fine angular-adjustment drive is via pin-20 engagement between tynes of the bifurcated end of arm 21.

It will be seen that specimen 10 can, on the one hand, be displaced for rapid scanning under the microscope by grasping handle 11 at the ball 12, all within the area permitted by the cut-out 24. On the other hand, the specimen 10 can also be finely adjusted as to its angular orientation, by rotational manipulation of sleeve 13. The direction of angular adjustment of the specimen accords with the direction of sleeve-13 adjustment, but at a strongly reduced ratio; the step-down ratio is primarily attributable to the relatively great radius of arm 21 and to the relatively small eccentric radius at contact of pin 20 with arm 21, while the like directions of sleeve-13 and member-22 rotation are the result of rotation-reversals at 15/16 and at 20/21.

It is to be noted that use of spur gearing at 15/16, in the context of fixed interconnection of rod 37, housing 14, tubular shaft (shank) 17 and the stage plate 6, provides opportunity to forwardly offset the location of ball 12 in the direction away from the microscope limb 2, thereby avoiding limb-2 interference with the hand of the user, in the course of manipulating the stage 6 (and specimen 10) via handle 11.

The stage-carrier cut-out 24 through which shank 17 of the handle 11 passes has approximately the same diameter as the specimen and limits the range of movement of the stage to the object region of interest. However, on one side of the cut-out 24, there is a local recess 31 into which shank 17 can very easily enter by guiding it along the outer periphery of the cut-out. When shank 17 thus engages in recess 31, the stage is in its so-called transfer position, namely the position in which a device (not shown here, but known per se) for automatic loading/unloading, transfers the specimen 10 to, or removes it from, the chuck 9. On the underside of the stage carrier 4, a mounted switch 28, has a probe element 30 extending into recess 31; switch 28 will be understood to initiate this automatic specimen-transfer process via connection 29 to suitable circuitry.

What is claimed is:

1. A microscope-stage assembly comprising base-mounting structure establishing a generally horizontal plane of support, a main slide supported by and guided for one axis of displacement with respect to said structure, a cross slide supported by and guided for a second axis of displacement with respect to said main slide, and a specimen mount rotatably carried by said cross slide, said main slide having a slotted opening beneath said cross slide and on an alignment parallel to said second axis, said base-mounting structure having an opening beneath said main slide and its slot, said last-mentioned opening having an area approximating the specimen area to be examined under microscope, an actuating handle secured to the underside of the cross slide and extending therebeneath through and below both openings, and rotary-adjustment means including an actuator movably carried by said handle and accessible below both openings, said rotary-adjustment means having rotary-drive connection to said specimen mount solely via said openings.

2. A microscope-stage assembly comprising base-mounting structure establishing a generally horizontal plane of support, a main slide supported by and guided for one axis of displacement with respect to said structure, a specimen-mounting cross slide supported by and guided for a second axis of displacement with respect to said main slide, said main slide having a slotted opening beneath said cross slide and on an alignment parallel to said second axis, said base-mounting structure having a relatively large opening beneath said main slide and its slot, said last-mentioned opening having an area approximating the specimen area to be examined under microscope, and an actuating handle secured to the underside of the cross slide and extending therebeneath through and below both openings, said relatively large opening defining the range of movement of said handle.

3. A microscope-stage assembly according to claim 2, in which at least at one location along its periphery the opening in said base-mounting structure has a local recess into which said handle is receivable in its extension through both said openings.

4. A microscope-stage assembly according to claim 3, in which a switch which can be actuated by the recess-engaging part of the handle is associated with the local recess.

5. A microscope-stage assembly according to claim 2, in which said base-mounting structure includes means for securing the same to a microscope, said means and at least that portion of said structure having said base-mounting opening being integral formations of a single piece.

6. A microscope-stage assembly according to claim 2, in which said specimen receiver is carried by said cross slide and said receiver is rotatable at least through a relatively small angle.

7. A microscope-stage assembly according to claim 6, in which drive means for angular adjustment of said receiver is integrated into said actuating handle.

8. A microscope-stage assembly according to claim 7, in which said drive means comprises an actuating sleeve which is rotatable on said handle, and a step-down actuating transmission is provided from said sleeve to said receiver.

* * * * *